(12) United States Patent
James et al.

(10) Patent No.: US 10,630,788 B2
(45) Date of Patent: *Apr. 21, 2020

(54) DATA PACKET TRANSMISSION OPTIMIZATION OF DATA USED FOR CONTENT ITEM SELECTION

(71) Applicant: Google LLC, Mountain View, CA (US)

(72) Inventors: Gavin James, Mountain View, CA (US); Justin Lewis, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,945

(22) Filed: Nov. 15, 2018

(65) Prior Publication Data

US 2019/0089793 A1 Mar. 21, 2019

Related U.S. Application Data

(63) Continuation of application No. 15/403,990, filed on Jan. 11, 2017, now Pat. No. 10,165,064.

(51) Int. Cl.
*H04L 29/08* (2006.01)
*G06Q 30/02* (2012.01)

(52) U.S. Cl.
CPC ............. *H04L 67/20* (2013.01); *G06Q 30/02* (2013.01); *H04L 67/10* (2013.01); *H04L 67/22* (2013.01)

(58) Field of Classification Search
CPC ......... H01L 21/67333; H01L 21/68764; H01L 21/68735; H01L 21/68771; C23C 16/46;
(Continued)

(56) References Cited

U.S. PATENT DOCUMENTS 7,809,605 B2 10/2010 Tonse et al.
8,200,683 B2 * 6/2012 Gupta ................. G06F 16/3334
707/758

(Continued)

OTHER PUBLICATIONS

Baidu Advertising, Guide to Baidu's PPC Interface, 10 pages, 2014 Nanjing Marketing Group Ltd.
(Continued)

*Primary Examiner* — Michael Won
(74) *Attorney, Agent, or Firm* — Foley & Lardner LLP

(57) ABSTRACT

Systems and methods for providing third-party content can include a data processing system receiving criteria defining online activities of an online activity type related to a product or service context from a computing device of a third-party content provider. The data processing system can identify a cluster of client devices based on the defined online activities, and determine a subset of keywords associated with the defined online activities and the identified cluster of client devices. The data processing system can determine a performance metric of the subset of keywords based on the cluster of client devices, and provide the subset of keywords and the performance metric to the computing device. The data processing system can receive from the computing device a parameter value of a first keyword of the subset of keywords to use in selecting content items of the third-party content provider associated with the first keyword.

20 Claims, 6 Drawing Sheets

(58) Field of Classification Search
CPC ........... C23C 16/4584; Y10T 29/49826; Y10T 29/49837; H04L 67/20; H04L 67/22; H04L 67/10; G06Q 30/02

See application file for complete search history.

(56) References Cited

U.S. PATENT DOCUMENTS

| | | | | |
|---|---|---|---|---|
| 8,949,261 | B2* | 2/2015 | Lunt | G06Q 30/0275 |
| | | | | 707/758 |
| 9,183,203 | B1 | 11/2015 | Tuchman et al. | |
| 9,367,583 | B1* | 6/2016 | Bernard | G06Q 30/02 |
| 9,405,841 | B2 | 8/2016 | Amacker et al. | |
| 9,779,144 | B1 | 10/2017 | Hampson et al. | |
| 9,843,649 | B1 | 12/2017 | Hampson et al. | |
| 10,210,218 | B2* | 2/2019 | Crosby | G06F 16/24578 |
| 10,380,650 | B2* | 8/2019 | Hamedi | G06Q 30/0271 |
| 2006/0242129 | A1 | 10/2006 | Libes et al. | |
| 2007/0060099 | A1 | 3/2007 | Ramer et al. | |
| 2008/0221987 | A1 | 9/2008 | Sundaresan et al. | |
| 2009/0125517 | A1 | 5/2009 | Krishnaswamy et al. | |
| 2009/0271228 | A1 | 10/2009 | Bilenko et al. | |
| 2009/0299998 | A1* | 12/2009 | Kim | G06F 16/951 |
| 2010/0094835 | A1 | 4/2010 | Lu et al. | |
| 2012/0246016 | A1 | 9/2012 | Hubinette | |
| 2013/0066821 | A1* | 3/2013 | Moore | G06Q 30/0259 |
| | | | | 706/46 |
| 2013/0073335 | A1 | 3/2013 | Tang et al. | |
| 2013/0159505 | A1 | 6/2013 | Mason et al. | |
| 2013/0304818 | A1 | 11/2013 | Brumleve et al. | |
| 2014/0062011 | A1 | 3/2014 | Satomi | |
| 2014/0068011 | A1 | 3/2014 | Zhang et al. | |
| 2014/0108162 | A1 | 4/2014 | Kumar et al. | |
| 2014/0278796 | A1 | 9/2014 | Arini et al. | |
| 2015/0066630 | A1 | 3/2015 | Ge et al. | |
| 2016/0078471 | A1* | 3/2016 | Hamedi | G06F 16/24578 |
| | | | | 705/14.41 |
| 2016/0078473 | A1 | 3/2016 | Dabbiru et al. | |
| 2016/0103932 | A1* | 4/2016 | Sathish | G06F 3/04883 |
| | | | | 715/767 |
| 2016/0225015 | A1* | 8/2016 | Subramanya | G06Q 30/0244 |
| 2016/0225034 | A1* | 8/2016 | Putrevu | G06Q 30/0277 |
| 2016/0255082 | A1* | 9/2016 | Rathod | H04L 63/10 |
| | | | | 726/1 |
| 2016/0277516 | A1 | 9/2016 | Hummel et al. | |
| 2017/0109446 | A1* | 4/2017 | Wu | G06F 7/02 |
| 2017/0255536 | A1 | 9/2017 | Weissinger et al. | |
| 2018/0198875 | A1 | 7/2018 | James et al. | |
| 2018/0203934 | A1 | 7/2018 | Hampson et al. | |

OTHER PUBLICATIONS

Bidding and Traffic Estimation, Microsoft 2016, 10 page.
Facebook, Audience Targeting Options, Facebook copyright 2016, 3 Pages.
Facebook, Budget, Bidding and Scheduling, 2 pages, Facebook2016.
Facebook, Understanding How Bidding and our ADS Auction Work, 4 pages, Facebook 2016.
International Search Report for PCT/US2017/03423 dated Oct. 13, 2017. (3 pages).
Notice of Allowance on U.S. Appl. No. 15/403,990 dated Jul. 26, 2018.
Salat Kevin, Improved Demographic Targeting in Bing Ads, Jul. 7, 2015, 8 pages, 2016 Microsoft.
Written Opinion for PCT/US2017/034273 dated Oct. 13, 2017. (7 pages).
International Preliminary Report on Patentability on Appln. Ser. No. PCT/US2017/034273 dated Jul. 25, 2019 (9 pages).

* cited by examiner

| Time Stamp | Product/Service category | Resource | Device ID | Keywords | Action Type |
|---|---|---|---|---|---|
| 14:07 10/03/16 | cable Internet | aaa.com | xxxxxxxxx116a | "cable Internet" | Subscribe |
| 15:35 10/03/16 | cell phone plans | xyz.com | xxxxxxxxx223f | "wireless line" | Customer Service Call |
| 21:23 10/03/16 | cell phone plans | bbb.com | xxxxxxxxx768d | "wireless plan" | Subscribe |
| 22:01 10/03/16 | cable Internet | ccc.com | xxxxxxxxx934j | "Internet service" | Customer Service Call |
| 09:20 10/04/16 | cell phone plans | xyz.com | xxxxxxxxx752k | "wireless plan" | Subscribe |
| 09:45 10/04/16 | cell phone plans | xyz.com | xxxxxxxxx590e | "wireless service" | Subscribe |
| 11:16 10/04/16 | cable Internet | aaa.com | xxxxxxxxx981c | "home Internet" | Webpage Access |
| 12:02 10/04/16 | cable Internet | ccc.com | xxxxxxxxx351b | "cable Internet" | Customer Service Call |
| 13:56 10/04/16 | cable Internet | ccc.com | xxxxxxxxx722a | "home Internet" | Customer Service Call |
| 15:32 10/04/16 | cable Internet | aaa.com | xxxxxxxxx443c | "business Internet" | Webpage Access |
| 16:13 10/04/16 | cell phone plans | bbb.com | xxxxxxxxx391f | "wireless service" | Webpage Access |

FIG. 3

DATA PACKET TRANSMISSION OPTIMIZATION OF DATA USED FOR CONTENT ITEM SELECTION

CROSS-REFERENCE TO RELATED APPLICATIONS

This application is a continuation of U.S. patent application Ser. No. 15/403,990, filed on Jan. 11, 2017, the entire contents of which are hereby incorporated by reference.

BACKGROUND

Content delivery systems manage selection and delivery of third-party content for a usually large number of third-party content providers. For each third-party content provider, a content delivery system maintains a set of criteria for selecting respective third-party content to deliver to client devices. The selection of third-party content items for delivery to client devices can involve multiple comparisons between keywords. The total amount of criteria maintained in association with the third-party content providers can impact the amount of memory resources and computational resources used by a content delivery system, and the amount of processing performed when handling requests for third-party content. Furthermore, as the number of third-party content providers or the number of respective criteria increases, selecting and distributing third-party content items in real time, responsive to requests for third-party content calls, becomes more challenging and more demanding in terms of memory and computational resources.

SUMMARY

According to at least one aspect, a system to optimize exchange of data used for third-party content selection can include a data processing system having a keyword selection component, a keyword performance component, a historic online activity database, and a content item selection component. The keyword selection component can identify, based on data stored in the historic online activity database, a cluster of client devices that previously performed a plurality of online activities of an online activity type in relation to a product or service context. The keyword selection component can determine, based on the data stored in the historic online activity database, from a plurality of keywords, a subset of keywords associated with the plurality of online activities of the online activity type that the cluster of client devices performed in relation to the product or service context. The keyword performance component can determine a performance metric of the subset of keywords based on the plurality of online activities of the online activity type that the cluster of client devices performed in relation to the product or service context. The keyword selection component can transmit, to a computing device of a third-party content provider, the subset of keywords and the performance metric. The content item selection component can receive, from the computing device of the third-party content provider, a parameter value for a first keyword of the subset of keywords. The parameter value can be determined, for example, by the computing device based on the performance metric. The content item selection component can receive a request for third-party content for display on a client device. The request can be indicative of the first keyword, and select, based on the parameter value, a content item of the third-party content provider associated with the product or service context. The content item selection component can provide the selected content item for display on the client device.

According to at least one aspect, a system to optimize exchange of data used for third-party content selection can include a data processing system having a keyword selection component, a keyword performance component, and a historic online activity database. The keyword selection component can identify, based on data stored in the historic online activity database, a cluster of client devices that previously performed a plurality of online activities of an online activity type in relation to a product or service context. The keyword selection component can determine, based on the data stored in the historic online activity database, from a plurality of keywords, a subset of keywords associated with the plurality of online activities of the online activity type that the cluster of client devices performed in relation to the product or service context. The keyword performance component can determine a performance metric of the subset of keywords based on the plurality of online activities of the online activity type that the cluster of client devices performed in relation to the product or service context. The keyword selection component can transmit, to a computing device of a third-party content provider, the subset of keywords and the performance metric. A parameter value can be determined, by the computing device of the third-party content provider, for a first keyword of the subset of keywords based on the performance metric. The parameter value can be used to select a content item of the third-party content provider associated with the product or service context responsive to a request for third-party content. The request for third-party content can be indicative of the first keyword. The selected content item can be provided for display on a client device.

According to at least one aspect, a method of providing third-party content based on keyword performances can include a data processing system identifying, based on data stored in a historic online activity database, a cluster of client devices that previously performed a plurality of online activities of an online activity type in relation to a product or service context. The data processing system can determine, based on the data stored in the historic online activity database, from a plurality of keywords, a subset of keywords associated with the plurality of online activities of the online activity type that the cluster of client devices performed in relation to the product or service context. The data processing system can determine a performance metric of the subset of keywords based on the plurality of online activities of the online activity type that the cluster of client devices performed in relation to the product or service context. The data processing system can provide, for a computing device of a third-party content provider, access to the subset of keywords and the performance metric. A parameter value can be determined, by the computing device of the third-party content provider, for a first keyword of the subset of keywords based on the performance metric. The parameter value can be used to select a content item of the third-party content provider associated with the product or service context responsive to a request for third-party content. The request for third-party content can be indicative of the first keyword. The selected content item can be provided for display on a client device.

According to at least one aspect, a non-transitory computer-readable medium comprising computer code instructions stored thereon, which when executed by one or more processors, cause a data processing system to perform a method of providing third-party content based on keyword performances. The method can include identifying, based on data stored in a historic online activity database, a cluster of client devices that previously performed a plurality of online activities of an online activity type in relation to a product or service context. The data processing system can determine, based on the data stored in the historic online activity database, from a plurality of keywords, a subset of keywords associated with the plurality of online activities of the online activity type that the cluster of client devices performed in relation to the product or service context. The data processing system can determine a performance metric of the subset of keywords based on the plurality of online activities of the online activity type that the cluster of client devices performed in relation to the product or service context. The data processing system can provide, for a computing device of a third-party content provider, access to the subset of keywords and the performance metric. A parameter value can be determined, by the computing device of the third-party content provider, for a first keyword of the subset of keywords based on the performance metric. The parameter value can be used to select a content item of the third-party content provider associated with the product or service context responsive to a request for third-party content. The request for third-party content can be indicative of the first keyword. The selected content item can be provided for display on a client device.

BRIEF DESCRIPTION OF THE DRAWINGS

The details of one or more implementations are set forth in the accompanying drawings and the description below, Other features, aspects, and advantages of the disclosure will become apparent from the description, the drawings, and the claims, in which:

FIG. 3 shows a table storing records of historic online activities;

Figure 1:
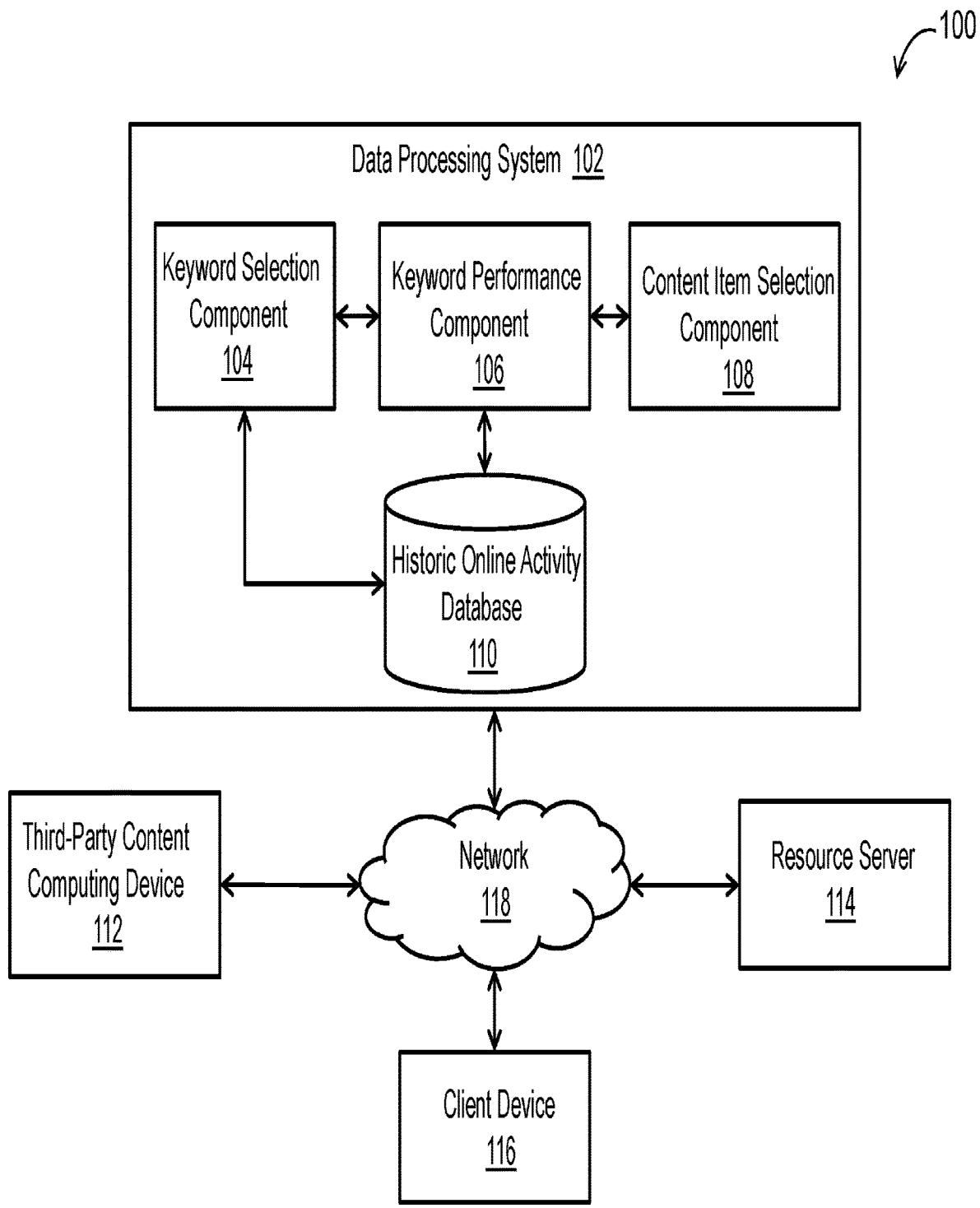
FIG. 1 is a block diagram of an implementation of a computer environment for providing third-party content to client devices for display.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Third-party content providers provide third-party content for display with information resources (e.g., websites, gaming platforms, or maps) on client devices based on a plurality of criteria. For instance, a third-party content provider can select or identify a set of keywords based on which to provide content items of that third-party content provider for display on client devices. The set of keywords can define a context that is relevant to the third-party content provider. For example, the set of keywords can be related to a service, product, or content item of the third-party content provider. The third-party content provider can decide to provide respective content items for display on clients that perform a search using a keyword of the selected set of keywords, access a resource (e.g., a website or client application) that includes a keyword of the selected set of keywords, or have preferences defined by a keyword of the selected set of keywords.

A data processing system, delivering third-party content of third-party content providers to client devices, can suggest keywords to third-party content providers for use as criteria to decide whether or not to provide respective content items for display client devices. The data processing system can suggest keywords based on maintained historical information indicative of previous online activities associated with different client devices and correlations between such online activities and various keywords. The historical information can include statistical data indicative of keyword performances (e.g., keyword's success in triggering some online activities) based on previously recorded online activities. The number of keywords available for any given context can be significantly large (e.g., more than a hundred keywords). A large number of keywords can be confusing for third-party content providers to dig through. Also, maintaining an unnecessarily large number of keywords for each third-party content provider can result in a wasteful use of memory and computational resources of the data processing system. For instance, considering the typically huge number of third-party content provider accounts managed by the data processing system (e.g., thousands or hundreds of thousands), a large number of keywords per account can exhaust the memory resources of the data processing system. Furthermore, each time a request for third party content is received, the data processing system has to cache and compare a large number of keywords per account to keywords associated with the third-party content request. As the number of keywords per account increases, the caching and comparison of the keywords result in high consumption of computational resources and longer processing time. A technical problem addressed by this disclosure is how to reduce memory and computational resources' usage by the data processing system while providing or recommending relevant and keywords to third-party content providers that are more likely than others to trigger online activities by client devices.

The data processing system can maintain a historic online activity database to continuously assess the performance of various keywords. The data processing system can be directly involved in some online activities, such as online search or web page access by client devices. For example, the data processing system can receive and process search queries from client devices or can receive requests for third-party content responsive to client devices accessing webpages. Search queries can include device identifiers (IDs) identifying the client devices initiating the search queries, and keywords used in the search queries. Also, requests for third-party content can include device IDs of the client devices accessing the websites and keywords indicative of a context for requested third-party content. The data processing system can store indications of instances of online search or web site access in association with respective device Ds and respective keywords. Furthermore, when a client device interacts with a third-party content item, the third-party content items cause that client device to ping a computing device of the respective third-party content provider to report such interaction. Such approach can be referred to herein as tracking pixels, and the ping message transmitted by the client device can include the device ID of that client device, an ID of the third-party content item, and a type of the interaction.

In cases where client device online activities are related to online purchases, tracking pixels may not provide accurate mapping between such activities and any keywords (e.g., keywords used a search query or keywords associated with a third-party content item) that triggered such online activities. The inaccuracy in mapping detected online activities to the keywords that triggered the activities can result in inaccurate estimates of keywords' performances. To overcome such shortcoming in assessing keywords' performances, the data processing system can provide a variety of tools to monitor and detect online activities (e.g., instead of using tracking pixels), and provide third-party content providers with access to recorded online activities in association with respective keywords.

This disclosure describes mechanisms for generating keyword recommendations based on metrics derived from a specific cluster of client devices selected by a third-party content provider. A third-party content provider can select a cluster of client devices (e.g., among a larger population of client devices) to be used as a filter in a keyword recommendation interface. The third-party content provider can select client devices that are more likely than others to interact with the provider's content items, for example, based on historical online activities. The data processing system can determine keyword performance metrics, such as click-through-rate (CTR), impressions, average effective cost per thousand impressions (eCPM), conversion rate, or keyword scores based exclusively on the selected cluster of client devices instead of the entire population of client devices. The data processing system can consider only keywords used by the selected cluster of client devices for recommending to the third-party content provider. Also, the data processing system can determine the performance of the selected keywords based on online activities that are relevant to the third-party content provider. Considering only the selected cluster of client devices instead of the entire population of client devices to determine keywords for recommending to the third-party content provider results in substantial reduction in the number of determined keywords. The reduction in the number of determined keywords results in reduction in computational power and memory usage at the data processing system. The reduction in the number of determined keywords also leads to a smaller number of data packets exchanged between the data processing system and computing devices of third-party content providers, therefore, saving transmission bandwidth.

The third-party content provider can select the cluster of client devices as the client devices that performed a specific online activity with respect to a specified product or service attribute. For example, the third-party content provider can select to consider client devices that purchased a specific product or service online in the last 60 days (or any other duration). The third-party content provider can select to consider client devices that searched a specific product or service online in the last 30 days (or any other duration). The third-party content provider can select to consider client devices that accessed websites associated with (or manifested some interest in) a specific product or service in the last 60 days (or any other duration). Such selection of client device can allow the data processing system to restrict its keywords' processing or analysis to only client devices that are of relatively higher relevance to the third-party content provider. The restriction results in reduction in consumption of processing power and electrical power. The data processing system can identify the cluster of client devices based on the selected criteria by the third-party content provider and the database of historic online activities.

The data processing system can identify, based on the database of historic online activities, keywords used or associated with the selected cluster of client devices for recommending to the third-party content provider. The data processing system can evaluate or determine performance metrics of the identified keywords based on online activities performed by the cluster of client devices in relation with the specific product or service selected or identified by the third-party content provider. By limiting the selected keywords and respective performances to the selected cluster of client devices, the data processing system can recommend keywords that are of relatively higher relevance (e.g., compared to other keywords) to the third-party content provider, and provide keywords' performances that are more meaningful for the third-party content provider. The determined keywords' performance can allow the third-party content provider to more accurately assess the value of each keyword when setting a parameter value (e.g., a bid value) for that keyword. Also, by limiting the selected keywords and the respective performance metrics the data processing system can substantially reduce the number of data packets (e.g., carrying the selected keywords and the respective performance information) transferred between the data processing system and computing devices of the third-party content provider.

According to aspects of the present disclosure, systems and methods for providing third-party content based on keyword performances can include a data processing system identifying, based on data stored in a historic online activity database, a cluster of client devices that previously performed a plurality of online activities of an online activity type in relation to a product or service context. The data processing system can determine, based on the data stored in the historic online activity database, from a plurality of keywords, a subset of keywords associated with the plurality of online activities of the online activity type that the cluster of client devices performed in relation to the product or service context. The data processing system can determine a performance metric of the subset of keywords based on the plurality of online activities of the online activity type that the cluster of client devices performed in relation to the product or service context. The data processing system can provide transmit, to a computing device of a third-party content provider, data packets carrying the subset of keywords and the performance metric. The data processing system can receive, from the computing device of the third-party content provider, a parameter value for a first keyword of the subset of keywords, the parameter value determined based on the performance metric. The data processing system can receive a request for third-party content for display on a client device, the request indicative of the first keyword. The data processing system can select, based on the parameter value, a content item of the third-party content provider associated with the product or service context, and provide the selected content item for display on the client device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram of an implementation of a computer environment. 100 for providing third-party content to client devices for display. The computer environment 100 can include a data processing system 102, which can include a keyword selection component 104, a keyword performance component 106, a content item selection component 108, and a historic online activity database 110. The computer environment 100 can also include one or more third-party content computing devices 112, one or more resource servers 114, one or more client devices, and a network 118. The data processing system 102 can be communicatively coupled to the third-party content computing device(s) 112, the resource server(s) 114, and the client device(s) via the network 118. The network 118 may include a local area network (LAN), wide area network (WAN), a telephone network, such as the Public Switched Telephone Network (PSTN), a wireless link, an intranet, the Internet, or combinations thereof.

The data processing system 102 can be a content delivery system. The data processing system 102 can manage and store content selection criteria for various third-party content providers. The data processing system 102 can select third-party content items of a third-party content provider based on selection criteria of that third-party content provider, and provide the selected third-party content items for display on client devices 116. The data processing system 102 can include at least one logic device, such as a computing device having a data processor, to communicate via the network 118, for example with a resource server 114, a client device 116, or a third-party content computing device 112. The data processing system 102 can include one or more data processors, such as a content placement processor, configured to execute instructions stored in a memory device to perform one or more operations described herein. In other words, the one or more data processors and the memory device of the data processing system 102 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from Which processor can read instructions. The instructions may include code from any suitable computer programming language. The processor may process instructions and output data to perform processes associated with the keyword selection component 104, the keyword performance component 106, or the content item selection component 108. In addition to the processing circuit, the data processing system 102 may include one or more databases configured to store data, such as the historic online activity database 110, or a database to store content items and selection criteria for various third-party content providers. The data processing system 110 may also include an interface configured to receive data via the network 118 and to provide data from the data processing system 102 to any of the other devices on the network 118. The data processing system 102 can include a server, such as an ad server or otherwise.

The client device 116 can generate requests for third-party content, and transmit such requests to the data processing system 102. The client device 116 can receive third-party content items from the data processing system 102, responsive to such requests. The client device 116 can include one or more devices such as a computer, laptop, desktop, smart phone, tablet, personal digital assistant, set-top box for a television set, a smart television, or server device configured to communicate with other devices via the network 118. The client device 116 may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language.

The client device 116 can execute a software application (e.g., a web browser or other application) to retrieve content from other computing devices over the network 118. Such an application may be configured to retrieve first-party content from a resource server 114. An application running on the client device 116 may itself be first-party content (e.g., a game, a media player, etc.). The client device 116 can execute a web browser application that provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device 116 executing the instructions from the web browser application may request data from another device connected to the network 118 referred to by the URL address (e.g., a resource server 114). The other device may then provide web page data, geographic map data, or other data to the client device 116, which causes visual indicia to be displayed by the display of the client device 116. Accordingly, the browser window displays the retrieved first-party content, such as web pages from various websites, to facilitate user interaction with the first-party content.

The resource server 114 can include a computing device, such as a server, configured to host a resource, such as a web page or other resource (e.g., articles, comment threads, music, video, graphics, search results, information feeds, geographic map data, etc.). The resource server 114 may be a computer server (e.g., a file transfer protocol (FTP) server, file sharing server, web server, etc.) or a combination of servers (e.g., a data center, a cloud computing platform, etc.). The resource server 114 can provide resource data or other content (e.g., text documents, PDF files, and other forms of electronic documents) to the client device 116. The client device 116 can access the resource server 114 via the network 118 to request data to effect presentation of a resource of the resource server 114.

One or more third-party content providers may have third-party content computing devices 112 to directly or indirectly provide data fir third-party content items to the data processing system 102 or to other computing devices via network 118. The third-party content computing device(s) 112 associated with a third-party content provider can provide content selection criteria to the data processing system 102 to be used in selecting content items of that third-party content provider for presenting on client devices 116. The content items may be in any format that may be presented on a display of a client device 116, for example, graphical, text, image, audio, video, etc. The content items may also be a combination (hybrid) of the formats. The content items may be banner content items, interstitial content items, pop-up content items, rich media content items, hybrid content items, Flash content items, cross-domain iframe content items, etc. The content items may also include embedded information such as hyperlinks, metadata, links, machine-executable instructions, annotations, etc. In some instances, the third-party content computing devices 112 may be integrated into the data processing system 102 or the data for the third-party content items may be stored in a database of the data processing system 102. The content selection criteria can include indication of one or more themes, keywords, budget values, indications of local geographical areas of interest, dates or time intervals of interest, types of client devices of interest, types of first-party resources (e.g., websites, web applications, electronic maps, or standalone applications) of interest, bid values, or a combination thereof.

The data processing system 102 can receive, via the network 118, a request for a content item to present with a resource. The request may be received from a resource server 114, a client device 116, or any other computing device. The resource server 114 may be owned or ran by a first-party content provider that may include instructions for the data processing system 102 to provide third-party content items with one or more resources of the first-party content provider. The resource can include a web page, or geographic map data. The client device 116 can be a computing device operated by a user (represented by an anonymous device identifier), which, when accessing a resource of the resource server 114, can make a request to the data processing system 102 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the data processing system 102 receives can include a HyperText Transfer Protocol (HTTP) cookie or other data block that contains a device identifier (e.g., a random or pseudo random number) that represents the client device 116. The device information or the resource information may be appended to a content item request URL (e.g., contentitem.item/page/contentitem?devid=abc123&devnfo=A34r0). The device information or the resource information may be encoded prior to being appended to the content item request URL. The requesting device information or the resource information may be utilized by the data processing system 102 to select third-party content items to be served with the requested resource and presented on a display of a client device 116. Responsive to the content item request, the data processing system 102 can retrieve and process content selection parameters associated with a given third-party content provider to determine whether or not to provide a content item of that third-party content provider for presentation on the client device 120.

A resource of a resource server 114 can include a search engine feature. The search engine feature can receive a search query (e.g., a string of text) via an input feature (an input text box, etc.). The search engine can search an index of documents (e.g., other resources, such as web pages, etc.) for relevant search results based on the search query. The search results can be transmitted as a second resource to present the relevant search results, such as a search result web page, on a display of a client device 116. The search results can include, for example, web page titles, or hyperlinks. One or more third-party content items can be presented with the search results in a content item slot of the search result web page. Accordingly, the resource server 114 or the client device 116 can request one or more content items from the data processing system 102 to be presented in the content item slot of the search result web page. The content item request can include additional information, such as the user device information, the resource information, a quantity of content items, a format for the content items, the search query string, keywords of the search query string, information related to the query (e.g., geographic location information or temporal information). The resource server(s) 114 (or the data processing system 102) can make a delineation between the search results and the third-party content items to avert confusion. For example, the resource server(s) 114 (or the data processing system 102) can specify the display areas for both the search results and the third-party content items on web browser.

The data processing system 102 can include the keyword selection component 104, which can recommend keywords to third-party content providers. A third-party content provider may want to define criteria for selecting and presenting respective content items in terms of a set of keywords and a cluster of client devices. Specifically, the third-party content provider may want to limit his interest, with respect to scenarios where respective third-party content is provided for display on client devices 116, to requests for third-party content (or search queries) including at least one of a predefined set of keywords initiated by any client device 116 of a predefined cluster of client devices 116. The keyword selection component 104 can facilitate defining the cluster of client device and the set of keywords, for example, based on one or more criteria provided by the third-party content computing device 112.

The keyword selection component 104 can receive, from the third-party content computing device 112, data indicative of one or more criteria to identify a group of client devices 116 of interest to the third-party content provider. The criteria can be indicative of client devices 116 that previously engaged in activities associated with a product or service context, such as client devices 116 that have engaged in an online activity of a specified type in association with a given product or service. The types of online activities can include online purchase, online search, accessing a webpage, interacting with one or more specific content items, or a combination thereof. For example, the third-party content provider can identify the cluster of client devices of interest as client devices that purchased a specific product or service (e.g., a specific mobile phone, a specific wireless plan, a specific sports equipment, a specific accessory, or specific) online. The third-party content provider can identify the cluster of client devices of interest as client devices that searched a specific product or service of the third-party content provider or accessed a web page associated with such product or service.

The data received from the third-party content computing device 112 can be indicative of one or more online activities in association with a product or service category instead of a specific product or service. For example, the criteria can be indicative of an online activity (e.g., online purchase, online search, or access of a web page) associated with a car category (e.g., Sudan or sports cars), cell phone plans, or cable Internet services. The criteria may also be indicative of a time duration during Which the online activities of interest occurred. For example, the third-party content provider may specify an interest in client devices 116 that performed the specified activity within the last twelve months, the last three months, the last thirty days, the last end-of-year vacation, or any other time period. The criteria may also be indicative of a resource (e.g., a specific website, specific social media network, or specific mobile application) where the online activity occurred. For example, the third-party content provider may specify an interest in client devices 116 that purchased or searched a product or service on a specific website or specific mobile application (e.g., a specific E-commerce application). The criteria can further specify a geographical location (e.g., a specific metropolitan area) or a type of client devices (e.g., mobile devices) associated with client devices of interest to the third-party content provider. As discussed in further details below, the keyword selection component 104 can provide a user interface accessible via the third-party content computing devices 104 for selecting or defining criteria to determine the cluster (or group) of client devices of interest to the third-party content provider.

The keyword selection component 104 can identify the cluster of client devices of interest based on the criteria received from the third-party content client devices 112 and data stored in the historic online activity database 110. The historic online activity database 110 can include records of online activities performed by a plurality of client devices 116. Each record can include information indicative of the client device 116 that performed the activity reported in that record, the type of activity, the time and date of the activity, and the product, service, product category, or service category associated with the activity. The keyword selection component 104 can scan the historic online activity database 110 and identify all the client devices that meet the criteria received from the third-party content computing devices 112. For example, the keyword selection component 104 can scan data stored in the historic online activity database 110 to identify a cluster (or group) of client devices 116 that purchased a specific product or product of a specific category within the last twelve months.

The keyword selection component 104 can determine a subset of keywords among a plurality of keywords based on the identified cluster of client devices. For instance, the keyword selection component 104 can determine all keywords associated with the identified cluster of client devices, or keywords associated with the activities identified from the historic online activity database 110. For example, if the cluster of client devices were identified based on a plurality of online activities indicative of online purchases of a product of a given category, the keyword selection component 104 can determine all keywords associated with that plurality of activities. The keywords associated with a given online activity can include keywords within a search query that led to or is part of that activity, keywords associated with a webpage accessed as part of that activity, or keywords associated with a content item interacted with as part of that activity. The historic online activity database 110 can include the keywords associated with each online activity listed in the database. For example, each record in the historic online activity database 110 indicative of a respective online activity can include all the keywords associated with that activity. The keyword selection component 104 can determine the subset of keywords as the keywords used by, or associated with, the client devices 116 in the identified cluster of client devices. For example, the keyword selection component 104 can extract the keywords from profiles associated with the client devices 116 in the identified cluster of client devices.

In some instances, the keyword selection component 104 can identify one or more other keywords having similar attributes as the determined subset of keywords. For example, the keyword selection component 104 may identify the one or more other keywords as keywords that are synonyms to keywords in the determined subset of keywords or keywords indicative of new products or services in the product or service category of interest. The keyword selection component 104 may identify the one or more other keywords from resources (e.g., webpages) associated with the product or service category (or the specific product or service) identified by the third-party content provider. The keyword selection component 104 can update the determined subset of keywords to further include the one or more other keywords. Adding the other keyword(s) to the determined subset of keywords allows for introducing new keywords (e.g., do not show up in the historic online activity database 110 in relation with previous activities associated the product or service of interest) that may be relevant to the third-party content provider.

The keyword performance component 106 can determine a performance metric of the subset of keywords. The performance metric can include, for example, a click-through-rate (CTR) or a conversion rate. The performance metric can be indicative of the performance of the subset of keywords within the cluster of client devices. For instance, the keyword performance component 106 can determine the performance metric as the CTR or the conversion rate of the subset of keywords among the identified cluster of client devices. The keyword performance component 106 can identify, for example, all online searches performed by the cluster of client devices that include any of the keywords in the determined subset of keywords. The keyword performance component 106 can then determine the ratio of such searches that led to a conversion (e.g., an online purchase). In some instances, the keyword performance component 106 can identify all events where content (e.g., webpages, third-party content items, search results, or a combination thereof) associated with any of the keywords in the determined subset of keywords was presented to any client device 116 of the cluster of client devices. The keyword performance component 106 may limit such events to those related to content associated with the product or service category (or the specific product or service) identified by the third-party content provider. The keyword performance component 106 can then determine the ratio of the identified events that led to a conversion (e.g., an online purchase or other action performed by the receiving client device) as the performance metric of the subset of keywords.

The keyword performance component 106 may determine a separate performance metric for each keyword of the determined subset of keywords. For each keyword in the determined subset of keywords, the respective performance metric may be defined, for example, as the conversion rate or the CTR for that keyword. For each keyword in the determined subset of keywords, the keyword performance component 106 may determine the respective performance metric based on search queries or other events related to that keyword and that involved at least one client device 116 of the determined cluster of client devices and the product or service category specified by the third-party content provider. The keyword performance component 106 may also rank the subset of keywords based on the respective performance metrics. For example, the keyword performance component 106 may rank the subset of keywords according to a descending order of the respective performance metrics.

Determining the subset of keywords or the respective performance metrics may be computationally very demanding especially when considering a large number of keyword subset and client devices' cluster pairs (e.g., associated with various third-party content providers). Determining the subset of keywords or the respective performance metrics may involve scanning the historic online activity database 110. To reduce the computational complexity of these processes, the data processing system 102 may pre-define a set of product or service classes, and record (or maintain) historic online activities according to the pre-defined classes in the historic online activity database 110. Each product or service class can include one or more product or service categories. Examples of product or service classes can include "communication services," "sports equipment and athletic wear," "movies, music and games," "electronics and computers" or a combination thereof. The communication services class can include, for example, the categories "cable Internet," "cell phone plans," or a combination thereof. The historic online activity database 110 may include, for each class, one or more data structures (e.g., table, tree, linked list, or a combination thereof) to store records of historic online activities associated with that class. For a given product or service class, the historic online activity database 110 may include a plurality of data structures, for example, each associated with a respective geographic location. When receiving criteria from the third-party content computing device 112, the keyword selection component 104 may scan the data structures) related to the received criteria in the historic online activity database 110. Such arrangement of the historic online activity data within the historic online activity database can result in significant reduction in processing power and improve processing speed when determining the subset of keywords or the respective performance metrics.

The keyword performance component 106 may also determine global performance metrics of the determined subset of keywords. The global performance metrics can represent the performance of the subset of keywords among all, or a larger set of (e.g., substantially larger than the determined cluster of client devices), client devices 116. The global performance metrics can provide a reference level for the performance of any subset of keywords. For instance, by comparing the performance metrics of a subset of keywords determined based on the identified cluster of client devices to respective global performance metrics, the data processing system 102 (or the keyword performance component 106) can determine how well the subset of keywords perform among the identified cluster of client devices compared to the performance of the same keywords among the larger set of client devices 116.

The keyword selection component 104 (or the keyword performance component 106) can provide, for the third-party content computing device(s) 112, access to the determined subset of keywords and the respective performance metrics. For example, the keyword selection component 104 can transmit data packets carrying information indicative of the determined subset of keywords and the respective performance metrics for display on the third-party content computing device(s) 112 as recommended keywords. The determining of the subset of keywords based on the identified cluster of client devices, instead of a larger population of client devices, results in reduced number of keywords and smaller number of data packets transmitted between the data processing system and the third-party content computing device(s) 112. The keyword selection component 104 may also transmit data indicative of the ranking of the keywords within data packets carrying the subset of keywords for display on the third-party content computing device(s) 112. The keyword selection component 104 may also provide the global performance metrics of the subset of keywords together with the respective performance metrics computed based on the identified cluster of client devices.

The third-party content computing device(s) 112 can select or set at least one parameter value (e.g., a bid value) for at least one keyword of the subset of keywords responsive to display of the subset of keywords and the respective performance metric(s). The third-party content computing device(s) 112 may set the parameter value(s) automatically based on the performance metric(s), or may receive the parameter value as input from a respective user. The third-party content computing device(s) 112 can select or set for each keyword of the subset of keywords a respective parameter value. The third-party content computing device(s) 112 can provide the parameter value(s) to the data processing system, for example, via the network 118. The data processing system 102 (or the content item selection component 108) can receive and store the parameter value(s) in association with the respective keyword(s). For example, the data processing system 102 can store the parameter value(s) as part of an account associated with the third-party content provider. Providing the third-party content computing device(s) 112 with the subset of keywords and the respective performance metric(s) determined for a cluster of client devices allows the third-party content provider to bid specifically against a keyword and client device cluster pair, instead of bidding just against a keyword. Furthermore, the relatively small number of keywords in the subset of keywords (e.g., compared to considering all keywords that may be relevant to the third-party content provider) allows the third-party content computing device(s) 112 (or the third-party content provider) to set or select the parameter value(s) the reflects the expected performance of the keyword(s).

The third-party content computing device(a) 112 may also receive the global performance metrics of the subset of keywords. By comparing the performance metric determined based on the cluster of client devices to the global performance metrics, the third-party content computing device(s) 112 (or a user thereof) may determine how well a keyword of the subset of keywords performs within the cluster of client devices compared to within a larger population of client devices 116. Such comparison can allow the third-party content computing device(s) 112 (or the third-party content provider) to adequately set or select the parameter value in a way that reflects the expected performance of the keyword(s). For example, if a keyword performs substantially better among the cluster of client devices than among the larger population of client devices, the third-party content computing device(s) 112 can set or select a relatively higher parameter value for that keyword and the cluster of client devices.

The content item selection component 108 can receive a request for a third-party content item for display on a client device 116 of the cluster of client devices can receive and handle requests for third-party content to be displayed on client devices 116. The request for the third-party content item can be initiated by the client device 116, responsive to a requesting to access or accessing a resource (e.g., a website). The request for the third-party content item may include a search query. The request can include, or be indicative of, a keyword of the subset of keywords. The request for the third-party content item can also include contextual information, such as an identifier (ID) of the client device 116, indication of the resource accessed by the client device 116, geographical location of the client device 116, or a combination thereof. The content item selection component 108 can scan the request to determine any keywords or contextual information included therein.

The content item selection component 108 may select a third-party content item associated with the third-party content provider receiving the subset of keywords and the respective performance metric(s) from the data processing system 102. The content item selection component 108 can select the third-party content item based on the parameter value received from the third-party content computing device(a) 112 for the keyword included in the request. The content item selection component 108 may run a competition (or auction) among a plurality of third-party content providers, each participating with one or more respective content items. The content item selection component 108 may identify all third-party content providers that indicated interest (e.g., via content selection parameters) in keywords associated with (or included in) the received request for third-party content. For instance, the content item selection component may compare the keywords associated with the received request for third-party content to keywords associated with various third-party content providers. The content item selection component 108 can select the third-party content item associated with the highest parameter value.

The third-party content computing device(s) 112 can manage the selection and serving of content items by the data processing system 110 or the content item selection component 108. For instance, the third-party content computing device(s) 112 can provide the content selection parameters to the data processing system 110 to be used to select content items of the respective third-party content provider. For example, the third-party content computing device(s) 112 may set content selection parameters via a user interface that may define one or more content item conditions or constraints regarding the serving of content items. The third-party content computing device(s) 112 can specify that a content item or a set of content items are to be selected and served for client devices 116 in the identified cluster of client devices responsive to requests including any of predefined keywords (e.g., any of the determined subset of keywords). The third-party content computing device(s) 112 can specify that a content item or a set of content items are to be selected and served for client devices 116 associated with a certain geographic location or region, a certain language, a certain operating system, or a certain web browser for example. The third-party content computing device(s) 112 can set a single parameter value per content item or per subset of content items.

The content item selection component 108 can provide the selected content item for display on the client device 116 that initiated the request for the third-party content. The client device 116 can display the received third-party content item, for example, in an ad slot located in an accessed resource or in a search results webpage. Responsive to display of the third-party content item, the client device 116 may interact with the third-party content item by performing an online activity of the online activity type based on which the cluster of client devices was identified. For example, the client device 116 may click on the third-party content item, click on a link embedded in the third-party content item to access a webpage associated thereof, or execute an online purchase responsive to display of the third-party content item.

The client device 116 can transmit an indication of the online activity performed in response to display of the third-party content item to the data processing system 102. Upon receiving the indication of the online activity from the client device 116, the keyword performance component 106 can update the performance metric(s) for one or more keywords associated with the third-party content item, based on the online activity performed by the client device responsive to display of the third-party content item. For instance, the keyword performance component 106 may increment a number of online activities associated with the one or more keywords or store a record of the performed online activity in the historic online activity database 110.

By determining the subset of keywords based on the identified cluster of client devices, the data processing system 102 can recommend keywords that are relevant to the group of client devices 116 that are of interest to the third-party content provider. This approach leads to a shorter list of keywords that is more relevant to the third-party content provider than when considering a larger set of (or all) client devices. The conciseness of the subset of keywords results in significant memory saving when the data processing system 102 maintains a large number of keyword subsets for a large number of third-party content providers. Also, storing a relatively small subset of keywords for each third-party content provider can speed up the process handling received requests for third-party content. Specifically, the reduced number of keywords maintained for each third-party content provider leads to a reduction in the number of keyword comparisons (or matchings) performed in processing each request for third-party content, and therefore, results in reduced computational complexity and faster processing.

Figure 2A:
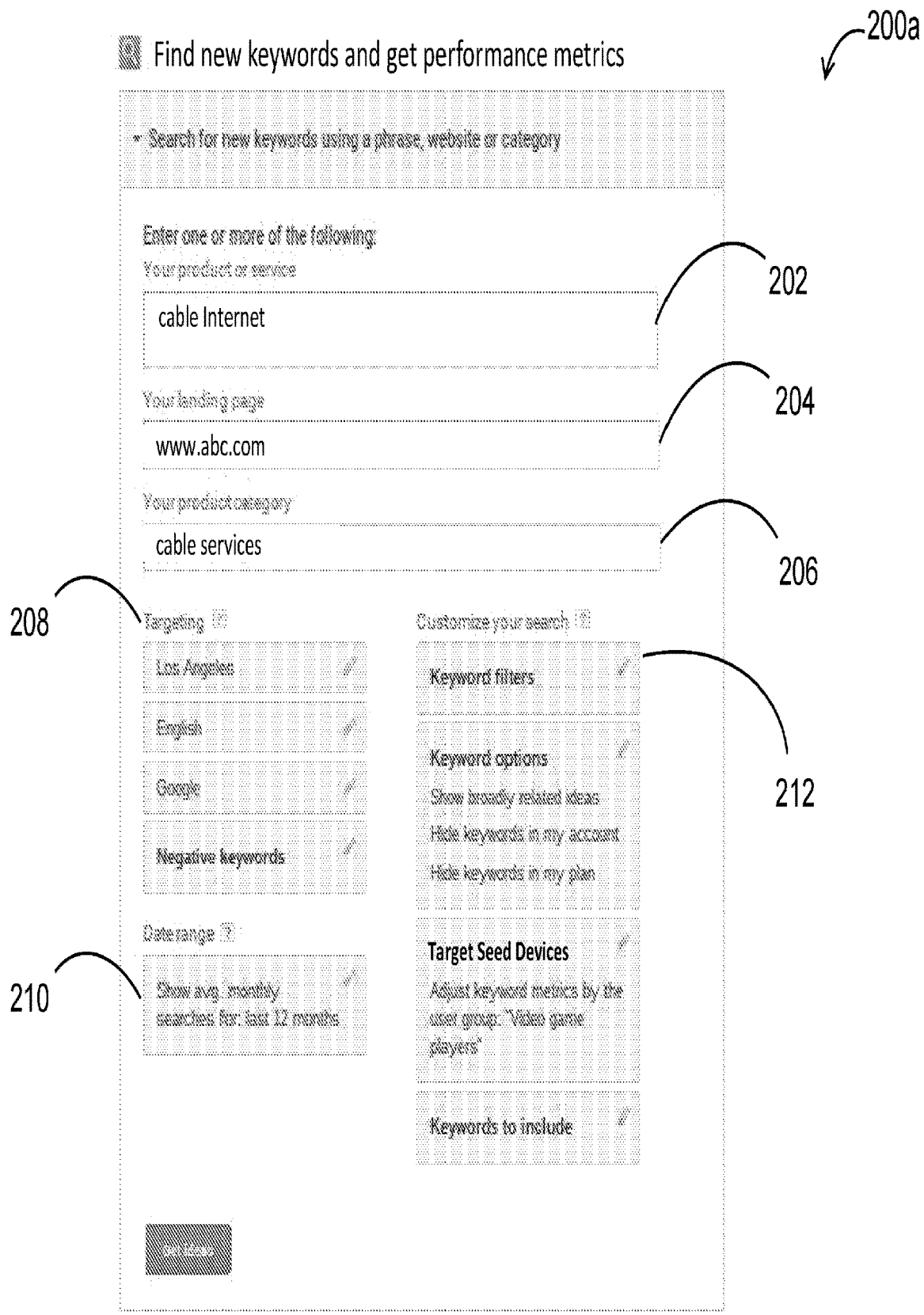
FIGS. 2A and 2B show screen shots of user interfaces (UN) provided on a third-party content computing device.
Figure 2B:
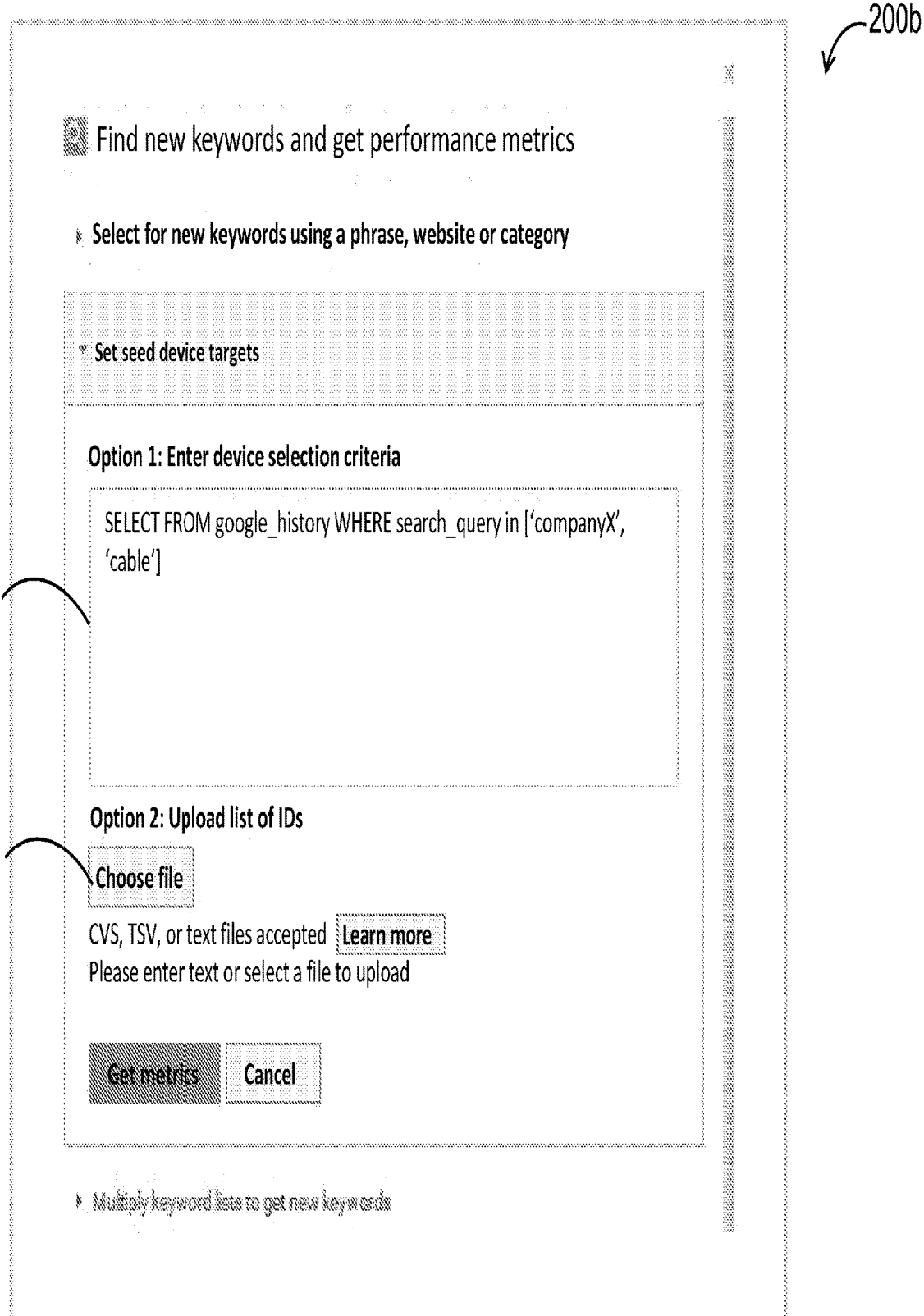

FIGS. 2A and 2B show screen shots of user interfaces (UIs) 200a and 200b provided on a third-party content computing device 112. The UI 200a can include a first text input item 202 for entering a specific product or service of the third-party content provider, a second text input item 204 for entering a landing page of the third-party content provider, and a third text input item 206 for entering a product or service category of interest to the third-party content provider. The UI 200a can include a plurality of selection items 208 for selecting geographical location, a language, and platform or website of interest to the third-party content provider. The geographical location can indicate the location of client devices 116 of interest to the third-party content provider or the location associated with historic online activities to be considered in identifying the cluster of client devices. The language can indicate the language of client devices 116 of interest to the third-party content provider. The platform or website can indicate the platform or website on which the third-party content provider likes to present respective content items, or the platform or website associated with historic online activities to be considered in identifying the cluster of client devices. The UI 200a can include a selection item 210 for selecting (or inputting) a date range of historic online activities to be considered. The UI 200a can include a plurality of selection items 212 for selecting and managing keywords of interest to the third-party content provider. The "Target Seed Devices" item allows entering criteria for selecting or identifying the cluster of client devices of interest to the third-party content provider.

Response to selection of the "Target Seed Devices" item, the client device 116 can display the UI 200b. The UI 200b can include a text input item 214 for entering a criteria to identify the cluster of client devices of interest to the third-party content provider. For example, the criteria can refer to client devices that performed online searches on Google platform using search queries that included at least one of the terms "company" and "cable," Responsive to the criteria provided through the text input item 214 and transmitted to the data processing system 102, the keyword selection component 104 can identify the client devices 116 of interest to the third-party content provider based on the received criteria. The UI 200b can also include an file upload item 216 to upload a document including client device IDs of interest to the third-party content provider.

FIG. 3 shows a table 300 storing data records of historic online activities. The table 300 can represent a data structure of the historic online activity database 110. The table 300 can store data records (e.g., each associated with row of the table 300) associated with a class of products or services. For example, the data records in table 300 can be indicative of historic online activities related to communication services, such as cable Internet or cell phone plans. The historic online activity database 110 can include a plurality of data structures (e.g., a plurality of tables), each associated with a respective class of products or services.

Each data record in table 300 can include a time stamp indicative of the time of occurrence of the respective online activity. The data record can include an indication of product or service category associated with the respective category, and resource address (or identifier) indicative of the resource or platform where the respective activity took place. The data record can include the device ID of the client device that executed the respective online activity, and one or more keywords associated with the respective online activity. The data record can also include an indication of the online activity type (or action type). Each data record may further include an indication of the geographic location of client device 116 at the time it executed the respective online activity, an indication of the type of client device (e.g., mobile phone, tablet, laptop, or desktop), or a combination thereof.

Upon receiving criteria defining client devices 116 of interest to the third-party content provider, the keyword selection component 104 can identify a class of products or services based on the received criteria, and scan the data structure (e.g., table 300) associated with that class of products or services. Scanning the data structure can include identifying data records in the data structure that match the received criteria. For example, if the criteria indicate a specific product or service category and a specific data range, the keyword selection component 104 can identify all data records having time stamps within the specific date range, and a product or service category matching the specific product or service category. The keyword selection component 104 can identify the cluster of client devices of interest to the third-party content provider based on device IDs associated with data records that match the received criteria.

The historic online activity database 110 may store or arrange data records in other different ways. For example, each class of products or services may be associated with a tree. The tree can include multiple child nodes, each representing a respective product or service category. Each child node can include a respective table (or other data structure) storing the data records for the respective product or service category.

Figure 4:
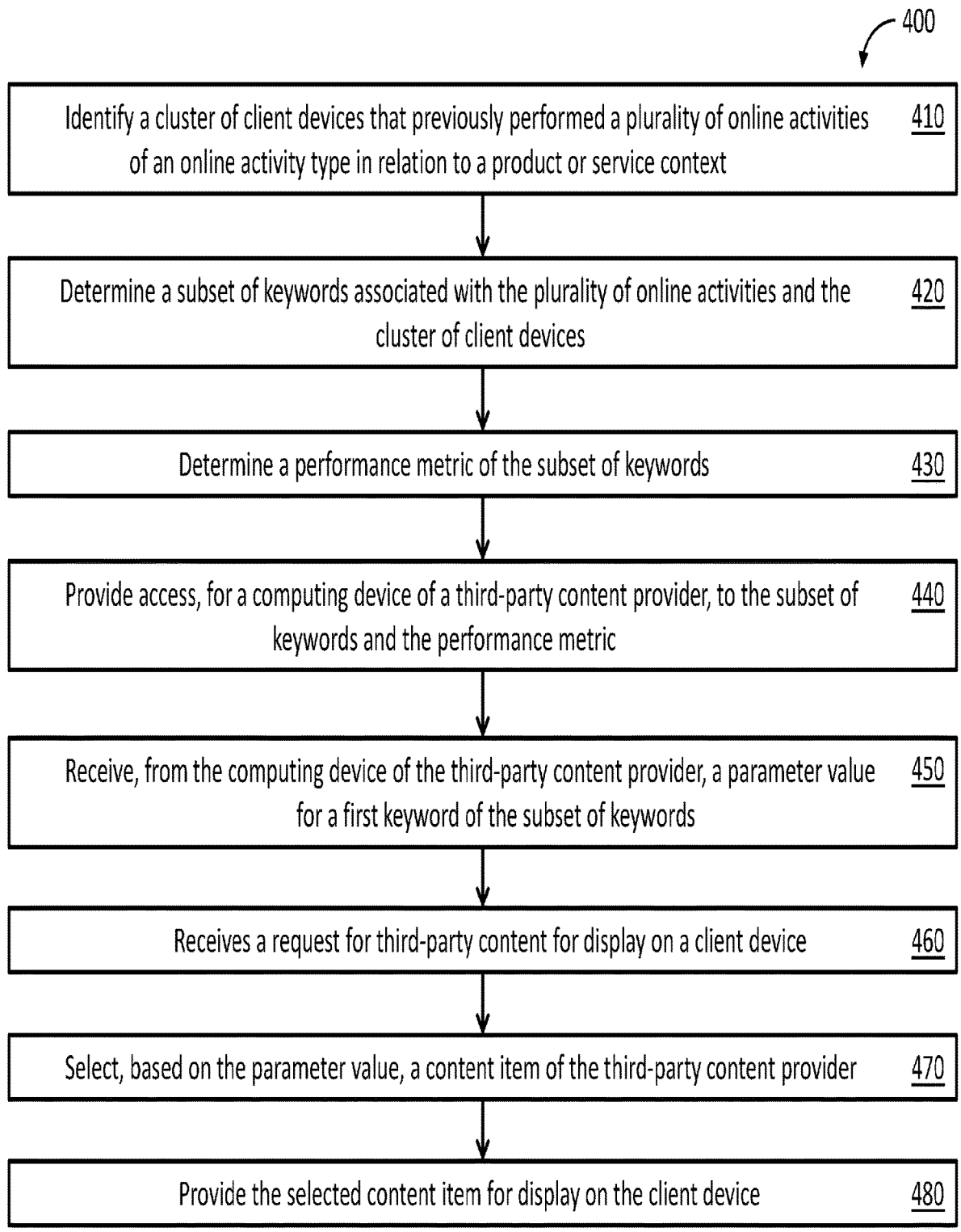
FIG. 4 shows a flowchart illustrating a method 400 of providing third-party content based on keyword performances.

FIG. 4 shows a flowchart illustrating a method 400 of providing third-party content based on keyword performances. The method 400 can include a data processing system identifying a cluster of client devices that previously performed a plurality of online activities of a given online activity type in relation to a product or service context (ACT 410) and determining a subset of keywords associated with the plurality of online activities and the cluster of client devices (ACT 420). The method 400 can include the data processing system determining a performance metric of the subset of keywords (ACT 430), and providing access, for a computing device of a third-patty content provider, to the subset of keywords and the performance metric (ACT 440). The method 400 can include the data processing system receiving, from the computing device of the third-party content provider, a parameter value for a first keyword of the subset of keywords (ACT 450). The method 400 can include the data processing system receiving a request for third-party content for display on a client device (ACT 460), and selecting a content item of the third-party content provider based on the parameter value (ACT 470). The method 400 can include the data processing system providing the selected content item for display on the client device (ACT 480).

Referring to FIGS. 1-4, the method 400 can include the data processing system 102 identifying a cluster of client devices that previously performed a plurality of online activities of a given online activity type in relation to a product or service context (ACT 410). The third-party content provider can specify, for example, via UIs 200a and 200b a set of criteria defining a group of historic online activities associated with a product or service context. The product or service context can include, for example, a product or service category or specific product or service. The online activity type can include online purchase, online search, accessing a particular web page, or a specific interaction with third-party content items, such as clicking on a content item or a link thereof or actuating an actuation item (e.g., a click to call item) of third-party content items. For example, the set of criteria may be indicative of online activities representing online purchases of a specific product or service (e.g., a specific mobile phone, a specific wireless plan, a specific sports equipment, a specific accessory, or specific) performed within a given time period. The set of criteria pay further specify a particular website or platform where the online activities occurred. The set of criteria may be indicative of online searches associated with a specific product or service category performed, for example, on a particular search engine.

Upon receiving the set of criteria from the third-party content computing device 112, the data processing system 102 can identify data records in the historic online activity database 110 that match the received set of criteria. As discussed above with regard to FIG. 3, the data processing system 102 can scan at least one data structure stored in the historic online activity database 110 to identify all data records that match the set of criteria. Each data record can include a device identifier of the client device 116 that performed the online activity described by that data record. The data processing system 102 can identify the cluster of client devices of interest to the third-party content provider in terms of the device IDs cited in the data records that match the set of criteria. The data records may further include other device information of the client devices, such as geographic locations, device types, device capabilities, or device preferences.

The method 400 can include the data processing system 110 determining a subset of keywords associated with the plurality of online activities and the cluster of client devices (ACT 420). As described above with regard to FIG. 3, each data record can include one or more respective keywords that lead to, or are associated with, the online activity described by that data record. The data processing system 102 can determine the subset of keywords as the keywords cited in the data records that match the received set of criteria. For example, considering the data records in table 300 associated with service category "cable Internet," the subset of keywords can include "cable Internet," "Internet service," "home Internet," and "business Internet," In some instances, the data processing system 102 may determine the subset of keywords as all keywords associated with the identified cluster of client devices. In such instances, the determined subset of keywords may include other keywords associated with the cluster of client devices but not cited in the data records matching the received set of criteria. For example, the data processing system 102 may extract keywords from profiles associated with the client devices 116 in the identified cluster of client devices.

In some instances, the data processing system 102 may identify one or more other keywords having similar attributes as the determined subset of keywords. For example, the data processing system 102 may identify the one or more other keywords as keywords that are synonyms to keywords in the determined subset of keywords or keywords indicative of new products or services in the product or service category of interest. The data processing system 102 may identify the one or more other keywords from resources (e.g., webpages) associated with the product or service category (or the specific product or service) identified by the third-party content provider. The keyword selection component 104 can update the determined subset of keywords to further include the one or more other keywords. Adding the other keyword(s) to the determined subset of keywords allows for introducing new keywords (e.g., do not show up in the historic online activity database 110 in relation with previous activities associated the product or service of interest) that may be relevant to the third-party content provider.

The method 400 can include the data processing system 102 determining a performance metric of the subset of keywords (ACT 430). The performance metric can include, for example, a click-through-rate (CTR) or a conversion rate. The performance metric can be indicative of the performance of the subset of keywords within the cluster of client devices. For instance, the data processing system 102 can determine the performance metric as the CTR or the conversion rate of the subset of keywords among the identified cluster of client devices. The data processing system 102 can identify, for example, all online searches performed by the cluster of client devices that include any of the keywords in the determined subset of keywords. The data processing system 102 can then determine the ratio of such searches that led to a conversion (e.g., an online purchase). In some instances, the data processing system 102 can identify all events where content (e.g., webpages, third-party content items, search results, or a combination thereof) associated with any of the keywords in the determined subset of keywords was presented to any client device 116 of the cluster of client devices. The data processing system 102 may limit such events to those related to content associated with the product or service category (or the specific product or service) identified in the received set of criteria. The data processing system 102 can then determine the ratio of the identified events that led to a conversion (e.g., an online purchase or other action performed by the receiving client device) as the performance metric of the subset of keywords.

The data processing system 102 may determine a separate performance metric for each keyword of the determined subset of keywords. For each keyword in the determined subset of keywords, the respective performance metric may be defined, for example, as the conversion rate or the CTR for that keyword considering only online activities associated with the identified cluster of client devices. For each keyword in the determined subset of keywords, the data processing system 102 may determine the respective performance metric based on search queries or other events related to that keyword and that involved at least one client device 116 of the determined cluster of client devices and the product or service category defined by the received set of criteria. The data processing system 102 may also rank the subset of keywords based on the respective performance metrics. For example, the data processing system 102 may rank the subset of keywords according to a descending order of the respective performance metrics.

The data processing system 102 may also determine global performance metrics of the determined subset of keywords. The global performance metrics can represent the performance of the subset of keywords among all, or a larger set of (e.g., substantially larger than the determined cluster of client devices), client devices 116. The global performance metrics can provide a reference level for the performance of any subset of keywords. For instance, by comparing the performance metrics of a subset of keywords determined based on the identified cluster of client devices to respective global performance metrics, the data processing system 102 (or the third-party content computing device 112) can determine how well the subset of keywords perform among the identified cluster of client devices compared to the performance of the same keywords among the larger set of client devices 116.

The method 400 can include the data processing system 102 providing access, for the third-party content computing device(s) 112, to the subset of keywords and the performance metric(s) (ACT 440). For example, the data processing system 102 can transmit data packets carrying information indicative of the determined subset of keywords and the respective performance metrics for display on the third-party content computing device(s) 112 as recommended keywords. The determining of the subset of keywords based on the identified cluster of client devices, instead of a larger population of client devices, results in reduced number of keywords and smaller number of data packets transmitted between the data processing system and the third-party content computing device(s) 112. The data processing system 102 may also transmit data indicative of the ranking of the keywords within data packets carrying the subset of keywords for display on the third-party content computing device(s) 112. The data processing system 102 may also transmit the global performance metrics of the subset of keywords, to the third-party content computing device(s) 112, together with the data packets including the subset of keywords and the respective performance metrics computed based on the identified cluster of client devices.

The method 400 can include the data processing system 102 receiving, from the third-party content computing device(s) 112, a parameter value for a first keyword of the subset of keywords (ACT 450). The third-party content computing device(s) 112 can select or set at least one parameter value (e.g., a bid value) for at least a first keyword of the subset of keywords responsive to display of the subset of keywords and the respective performance metric(s). The third-party content computing device(s) 112 may set the parameter value(s) automatically based on the performance metric(s), or may receive the parameter value as input from a respective user. The third-party content computing device(s) 112 can select or set for each keyword of the subset of keywords a respective parameter value. The third-party content computing device(s) 112 can provide the parameter value(s) to the data processing system 102, for example, via the network 118. The data processing system 102 can receive and store the parameter value in association with the first keyword. For example, the data processing system 102 can store the parameter value as part of an account associated with the third-party content provider. Providing the third-party content computing device(s) 112 with the subset of keywords and the respective performance metric(s) determined for a cluster of client devices allows the third-party content provider to bid specifically against a keyword and client device cluster pair, instead of bidding just against a keyword. Furthermore, the relatively small number of keywords in the subset of keywords (e.g., compared to considering all keywords that may be relevant to the third-party content provider) allows the third-party content computing device(a) 112 (or the third-party content provider) to set or select the parameter value(s) the reflects the expected performance of the keyword(s).

The method 400 can include the data processing system 102 receiving a request for third-party content for display on a client device 116 of the identified cluster of client devices (ACT 460). The data processing system 102 can receive a request for a third-party content item that is, for example, initiated by the client device 116, responsive to requesting to access or accessing a resource (e.g., a website). The request for the third-party content item may include a search query. The request can include, or be indicative of, the first keyword of the subset of keywords. The request for the third-party content item can also include contextual information, such as an identifier (ID) of the client device 116, indication of the resource accessed by the client device 116, geographical location of the client device 116, or a combination thereof. The data processing system 102 can scan the request to determine any keywords or contextual information included therein.

The method 400 may include the data processing system 102 selecting a content item of the third-party content provider based on the parameter value associated with the first keyword (ACT 470). The data processing system 102 may run a competition (or auction) among a plurality of third-party content providers, each participating with one or more respective content items. The data processing system 102 may identify all third-party content providers that indicated interest (e.g., via content selection parameters) in keywords associated with (or included in) the received request for third-party content. For instance, the data processing system 102 may compare the keywords associated with the received request for third-party content to keywords associated with various third-party content providers. The data processing system 102 can select the third-party content item associated with the highest parameter value.

The method 400 can include the data processing system 102 providing the selected content item for display on the client device 116 initiating the request for third-party content (ACT 480). The client device 116 can display the received third-party content item, for example, in an ad slot located in an accessed resource or in a search results webpage. Responsive to display of the third-party content item, the client device 116 may interact with the third-party content item, for example, by performing an online activity of the online activity type based on which the cluster of client devices was identified. For example, the client device 116 may click on the third-party content item, click on a link embedded in the third-party content item to access a webpage associated thereof, or execute an online purchase responsive to display of the third-party content item.

In some instances, the parameter value determined, by the computing device of the third-party content provider, for the first keyword of the subset of keywords based on the performance metric can be used (e.g., by the data processing system 102 or another computer system) to select a content item of the third-party content provider associated with the product or service context responsive to a received request for third-party content. The request for third-party content can be indicative of the first keyword. The selected content item can be provided (e.g., by the data processing system 102 or another computer system) for display on a client device.

The client device 116 can transmit an indication of the online activity performed in response to display of the third-party content item to the data processing system 102. Upon receiving the indication of the online activity from the client device 116, the data processing system 102 can update the performance metric(s) for one or more keywords, including the first keyword, associated with the determined subset of keywords, based on the online activity performed by the client device 116 responsive to display of the third-party content item. For instance, the data processing system 102 may increment a number of online activities associated with the one or more keywords or store a record of the performed online activity in the historic online activity database 110.

Figure 5:
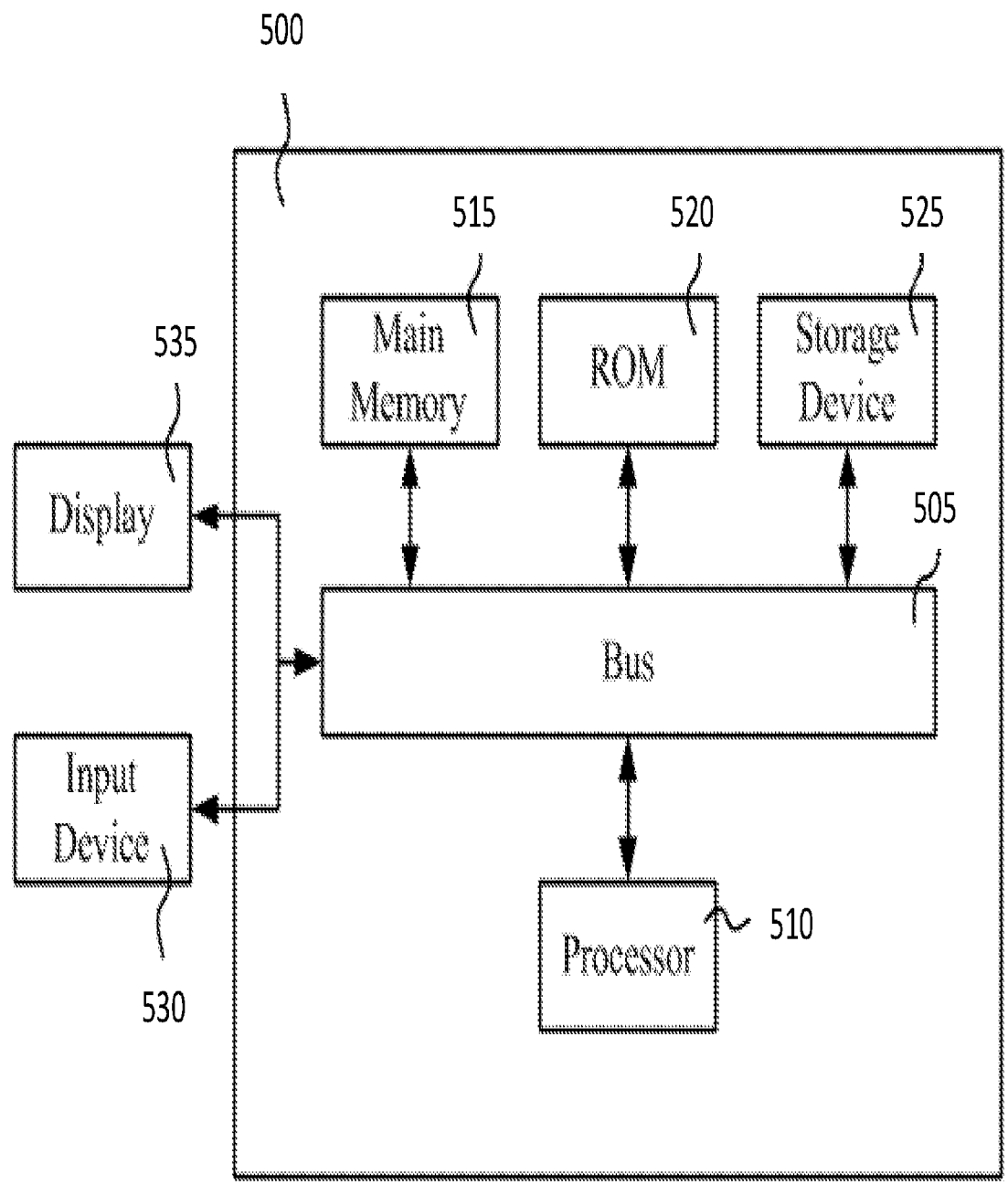
FIG. 5 is a block diagram depicting one implementation of a general architecture for a computer system that may be employed to implement various elements of the systems and methods described and illustrated herein.

FIG. 5 is a block diagram of a computer system 500 that can be used to implement the client device 116, data processing system 102, third-party content computing device 112, resource server 114, keyword selection component 104, keyword performance component 106, or content item selection component 108. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to various implementations, the processes or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions Contained in main memory 515 causes the computing system 500 to perform the illustrative processes or method ACTS described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data, Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a Computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form, of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items. Where technical features in the drawings, detailed description or any claim are followed by reference identifiers, the reference identifiers have been included to increase the intelligibility of the drawings, detailed description, and claims. Accordingly, neither the reference identifiers nor their absence have any limiting effect on the scope of any claim elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A system to optimize exchange of data used for third-party content selection, comprising:
   one or more processors; and
   a memory storing computer code instructions stored thereon, the computer code instructions when executed cause the one or more processors to:
   receive, via a user interface, selection criteria indicative of a product or service context of interest to a third party content provider, the selection criteria including at least a predetermined client device type and a predetermined time period;
   access, from a database, using the selection criteria including a device type, a data structure maintaining a plurality data records, each of the plurality of data records indicating at least one online activity associated with (i) a device identifier of a client device that performed the online activity, (ii) a time stamp, and (iii) one or more keywords;
   match, using the selection criteria including the device type, a plurality of data records, each of the plurality of data records including (i) a time stamp within the predetermined time period, and (ii) a device type the same as the predetermined client device type to determine a selected plurality of client device identifiers;
   identify, using the data records, a plurality of keywords associated with the selected plurality of client device identifiers
   for recommending to the third party content provider to use in providing third party content related to the product or service context;
   determine performance metric values of the plurality of keywords based on online activities indicated in the data records associated with the selected plurality of client device identifiers; and provide, to a computing device associated with the third-party content provider, access to the plurality of keywords and the performance metric values.

2. The system of claim 1, wherein the selection criteria include an indication of a product, or a service.

3. The system of claim 1, wherein the selection criteria include an indication of a product category, a service category.

4. The system of claim 1, wherein the selection criteria include an indication of an information resource.

5. The system of claim 1, wherein the selection criteria include an indication of geographical location.

6. The system of claim 1, wherein the performance metric values include click-through-rates (CTR) rates of the plurality of keywords within the plurality of client devices.

7. The system of claim 1, wherein the performance metric values include conversion rates of the plurality of keywords within the plurality of client devices.

8. The system of claim 1, wherein the computer code instructions when executed cause the one or more processors to:
rank the plurality of keywords based on the performance metric values; and
provide access, for the computing device of the third-party content provider, to ranking values of the subset of keywords.

9. The system of claim 1, wherein the computer code instructions when executed cause the one or more processors to:
identify one or more other keywords having similar attributes as the plurality of keywords; and
update the plurality of keywords to further include the one or more other keywords, the performance metric values determined based on the updated plurality of keywords.

10. The system of claim 1, wherein the online activities indicated by the plurality of data records include at least one of online purchases, online searches, or access events of an information resource.

11. A method of providing third-party content based on keyword performances, comprising:
receiving, by a data processing system, via a user interface, selection criteria indicative of a product or service context of interest to a third party content provider, the selection criteria including at least a predetermined client device type and a predetermined time period;
accessing, by the data processing system, from a database, using the selection criteria including a device type, a data structure maintaining a plurality data records, each of the plurality of data records indicating at least one online activity associated with (i) a device identifier of a client device that performed the online activity, (ii) a time stamp, and (iii) one or more keywords;
matching, by the data processing system, using the selection criteria including the device type, a plurality of data records, each of the plurality of data records including (i) a time stamp within the predetermined time period, and (ii) a device type the same as the predetermined client device type to determine a selected plurality of client device identifiers
identifying, by the data processing system, using the data records, a plurality of keywords associated with the selected plurality of client device identifiers;
for recommending to the third party content provider to use in providing third party content related to the product or service context;
determining, by the data processing system, performance metric values of the plurality of keywords based on online activities included in the data records associated with the selected plurality of client device identifiers; and
providing, by the data processing system, to a computing device associated with the third-party content provider, access to the plurality of keywords and the performance metric values.

12. The method of claim 11, wherein the selection criteria include an indication of a product, a service, a product category, a service category.

13. The method of claim 11, wherein the selection criteria include an indication of an information resource.

14. The method of claim 11, wherein the selection criteria include an indication of geographical location.

15. The method of claim 11, wherein the performance metric values include click-through-rates (CTR) rates of the subset of keywords within the cluster of client devices.

16. The method of claim 11, wherein the performance metric values include conversion rates of the subset of keywords within the cluster of client devices.

17. The method of claim 11, wherein the computer code instructions when executed cause the one or more processors to:
rank the plurality of keywords based on the performance metric values; and
provide access, for the computing device of the third-party content provider, to ranking values of the plurality of keywords.

18. The method of claim 11, wherein the computer code instructions when executed cause the one or more processors to:
identify one or more other keywords having similar attributes as the plurality of keywords; and
update the plurality of keywords to further include the one or more other keywords, the performance metric values determined based on the updated plurality of keywords.

19. The method of claim 11, wherein the online activities indicated by the data records include at least one of online purchases, online searches, or access events of an information resource.

20. A non-transitory computer-readable medium comprising computer code instructions stored thereon, the computer code instructions when executed cause a data processing system to:
receive, via a user interface, selection criteria indicative of a product or service context of interest to a third party content provider, the selection criteria including at least a predetermined client device type and a predetermined time period;
access, from a database, using the selection criteria including a device type, a data structure maintaining a plurality data records, each of the plurality of data records indicating at least one online activity associated with (i) a device identifier of a client device that performed the online activity, (ii) a time stamp, and (iii) one or more keywords;
match, using the selection criteria including the device type, a plurality of data records, each of the plurality of data records including (i) a time stamp within the predetermined time period, and (ii) a device type the same as the predetermined client device type to determine a selected plurality of client device identifiers;
identify, using the data records, a plurality of keywords associated with the selected plurality of client device identifiers for recommending to the third party content provider to use in providing third party content related to the product or service context;

determine performance metric values of the plurality of keywords based on online activities indicated in the data records performed by associated with the selected plurality of client device identifiers; and provide, to a computing device associated with the third-party content provider, access to the plurality of keywords and the performance metric values.

* * * * *